April 25, 1944.　　　A. GUERRERO　　　2,347,232

PLANT THINNING MACHINE

Filed June 26, 1942　　　3 Sheets-Sheet 1

INVENTOR
Ambrosio Guerrero
BY
Robt. W. Pearson
ATTORNEY

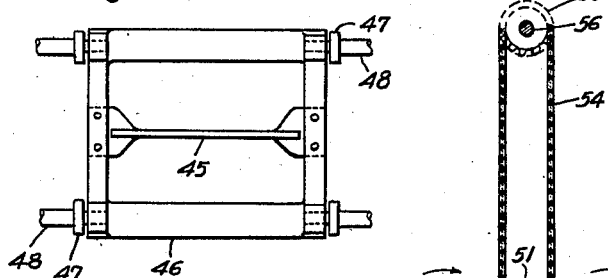
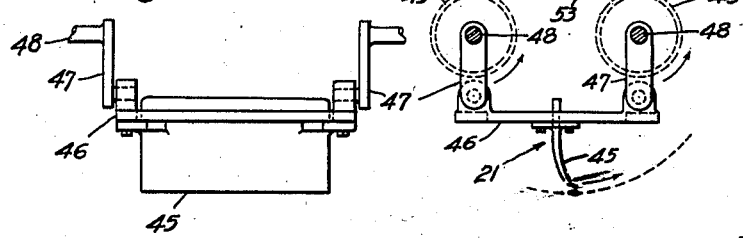
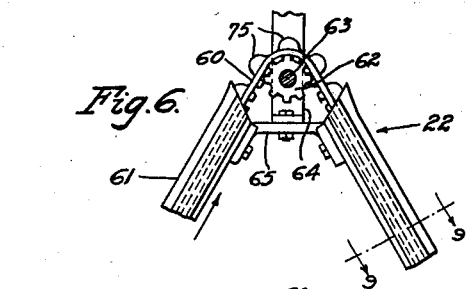
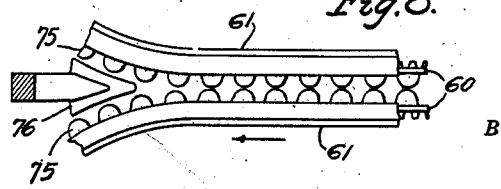

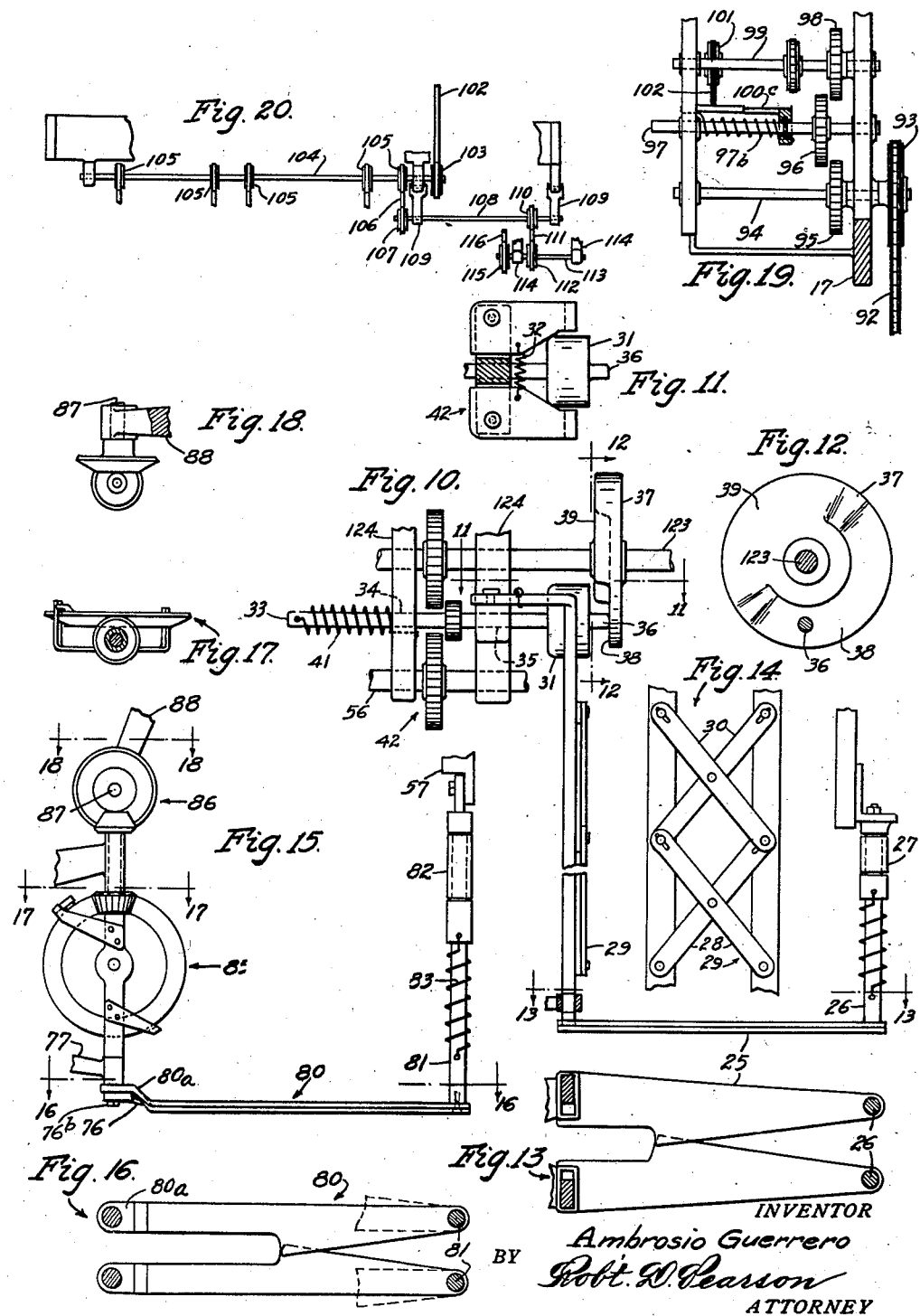

Patented Apr. 25, 1944

2,347,232

UNITED STATES PATENT OFFICE 2,347,232

PLANT THINNING MACHINE

Ambrosio Guerrero, Los Angeles, Calif.

Application June 26, 1942, Serial No. 448,647

5 Claims. (Cl. 97—11)

This invention relates to a plant thinning machine.

In the field production of various crops, for example of beets and of certain other garden vegetables grown in rows, it is found that in order to obtain a good "stand" that is to say, in order that the waste spaces between the plants of each row be reduced to the desired minimum, it is necessary that enough seed be strewn along each row to produce a much greater number of plants than can be grown to maturity without overcrowding; and that after the plants have become well started all except the proper number of evenly spaced apart plants be removed.

This removing or thinning out of the superfluous young plants has heretofore usually been performed by hand, which has proved to be a slow laborious undertaking and quite expensive to the producer.

It is the object of this invention to provide a machine which will in an expeditious, inexpensive manner perform the required thinning-out of plants grown from said seed sown in rows.

With a view to carrying out the foregoing purpose it is an object of the invention to provide a trailable or self-propelled vehicle having ground wheels to travel between rows of plants, in combination with a plurality of plant-removing implements carried by said vehicle and operatively connected with said wheels so that, as the vehicle is drawn across the field, the rotation of said wheels causes said implements to be operated at properly timed intervals, thus to remove from each row all except a proper number of uniformly spaced apart plants.

In addition to the foregoing general object of the invention more specific objects thereof are: To provide for and mount upon a trailable or self propelled vehicle an improved cutting implement to remove the tops of plants; to provide for said vehicle an improved excavating implement operatively connected with the wheels of the vehicle and timed to remove the root portions of such plants as must be extracted to effect the desired thinning out operation; and to provide the same vehicle with both the aforesaid implements operated by means properly timed to cause the same plants first to be topped and then to be removed each time the vehicle is caused to travel across the field.

Other objects, advantages and features of invention will hereinafter appear.

Referring to the accompanying drawings, which illustrate what is at present deemed to be a preferred embodiment of the invention, Fig. 1 is a plan view of the device.

Fig. 3 is a semi-diagrammatic elevation of the scooping assembly.

Fig. 4 is a plan view of the scoop assembly of Fig. 3.

Fig. 5 is a front view of Fig. 4.

Fig. 6 is a fragmental side elevation of the pulling device.

Fig. 7 is a front elevational view of the complete pulling device.

Fig. 8 is a fragmental sectional view on line 8—8 of Fig. 7.

Fig. 8a is a fragmental side elevation of one of the scavenger elements.

Fig. 9 is a sectional view on line 9—9 of Fig. 6.

Fig. 10 is a fragmental side elevation of the forward cutting element.

Fig. 11 is a fragmental section on line 11—11 of Fig. 10.

Fig. 12 is a section on line 12—12 of Fig. 10.

Fig. 13 is a section on line 13—13 of Fig. 10.

Fig. 14 is a fragmental front elevation of parts shown in Fig. 10.

Fig. 15 is a fragmental side elevational view of the rear cutting device.

Fig. 16 is a section on line 16—16 of Fig. 15.

Fig. 17 is a section on line 17—17 of Fig. 15.

Fig. 18 is a section on line 18—18 of Fig. 15.

Fig. 19 is a vertical section on line 19—19 of Fig. 2.

Fig. 20 is a vertical section on line 20—20 of Fig. 2.

Figure 1:
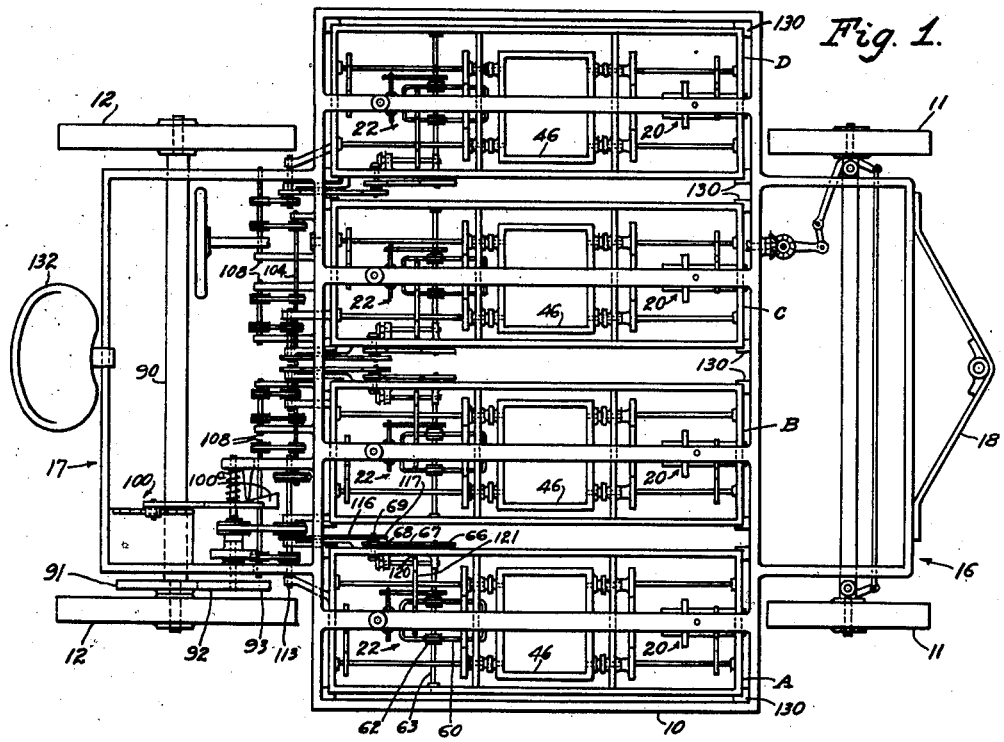

Referring in detail to the drawings, the invention is illustrated as embodied in a vehicle comprising a main frame 10 of a skeletal character which is rectangular as viewed in plan, said frame being supported by means of the front ground wheels 11 and rear ground wheels 12 with its lower portion adjacent to the surface of the ground and its upper portion ordinarily extending some five or six feet above the ground. The machine shown in the drawings is designed to operate upon four rows of plants at a time.

The frame 10 has a front portion 16 supported by the front ground wheels 11, and a rear portion 17 supported by the rear ground wheels 12. Said front part 16 is shown having a forward extension 18 to which a tractor may be attached to trail the vehicle along the rows of plants upon which it operates.

Figure 2:
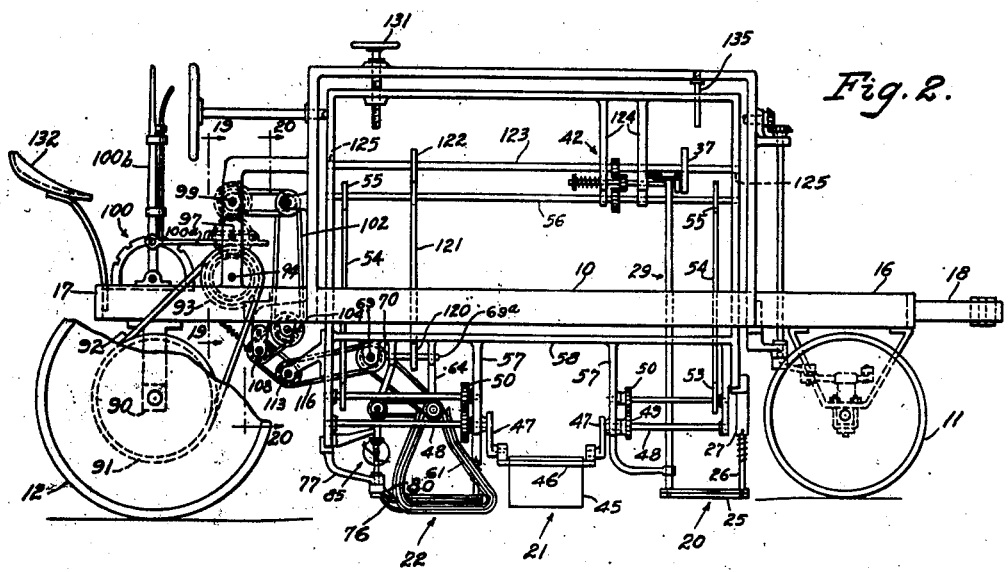
Fig. 2 is a side elevation thereof.

Looking at the machine as shown in Fig. 2 there are seen at the side thereof nearest to the observer three sets of mechanical devices for successively operating upon the plants of a row as the machine advances. From front to rear these are, first a front cutter assembly 20, then a scooping assembly 21, and lastly a pulling and cutting assembly 22. These three assemblies are duplicated in each of the four units A, B, C and D shown in plan in Fig. 1, and are all operatively connected with the rear ground wheels 12 to be operated in a properly timed sequence by the rotation of said wheels 12 as the machine is trailed across a field in the direction along which the rows of plants extend.

The front cutter assembly 20, shown in detail in Figs. 10, 11, 12, 13 and 14 includes a pair of shears having twin tapered blades 25 disposed in a horizontal plane with their narrow ends directed toward the front of the machine and diverging sufficiently to admit between them the plants of the row upon which they operate. The front end portion of each of said blades is pivotally supported by the lower part of a vertical pin 26 carried in a vertically adjustable manner by a hanger 27. The rear part of each blade 25 is connected by a link 28 with the lowest member of a vertically extending lazy-tong assembly 29. The upper part of this lazy-tong assembly is alternately widened and contracted by reason of its top pair of links 30 being repeatedly spread apart by means of a spreader 31, a spring 32 returning said links 30 to their original relation to each other whenever said spreader is withdrawn from between them. Said spreader is fixed to a shaft 33 which slides within bearings 34 and 35. From the back side of said spreader projects a pin 36 against which acts a cam wheel 37 having a rest portion 38 and an operating portion 39. This shaft has a hole through it to anchor one end of a tension spring 41, the opposite end of said spring being anchored to aforesaid bearing 34. This spring serves to keep the pin 36 in a working contact with said cam wheel 37. In a general way 42 designates the clutch assembly for controlling the operation of the topping device.

The scooping assembly 21 is timed to remove the toppings of the plants severed by the topping assembly 20. The hoe 45 is carried by a frame 46, the corner portions of which are carried by two pairs of cranks 47. Each pair of these cranks is fixed to a shaft 48 which carries a gear 49 driven by a gear 50. Said gears 50 have a common driving gear 51 fixed to the shaft 52. On the same shaft with gear 51 is fixed a sprocket wheel 53 driven by a sprocket chain 54. Said chain is driven by a sprocket wheel 55 fixed to shaft 56. Hangers 57 for this structure are carried by a bar 58 of the main framework.

After the scoop assembly 21 removes the severed tops the pulling device 22 grips and pulls out the remaining portions of part of the plants which have already been topped, leaving undisturbed the remaining number of such plants. Said pulling assembly includes the twin chains 60, which travel in guides 61 whereby said chains are caused to engage opposite sides of the plants in the row preparatory to pulling them out by the roots. Each of these chains is driven by a sprocket wheel 62, these two wheels 62 being fixed to a shaft 63. Said shaft 63, in turn, is held in its operative position by a bearing member 64, the lower part of this bearing member carrying a hanger 65 which supports the aforesaid pair of tracks or guides 61.

The shaft 63 carries a sprocket wheel 66 driven by a chain 67, in turn driven by sprocket wheel 68 fixed to shaft 69. The bearings 70 support said shaft 69, these bearings being carried by the aforementioned frame bar 58.

Each chain 60 is furnished along the side thereof opposite to its sprocket-wheel-engaging side, with a series of plant gripping teeth 75. These chains are operated backwardly in relation to the advancing vehicle in the direction indicated by an arrow in Fig. 8 and at such a speed as to cause them to grip the plants without dragging them either forwardly or rearwardly until they are uprooted and elevated sufficiently to be discharged by the divergence of the chains as their plant-gripping teeth 75 begin to diverge from each other as shown in the left hand portion of Fig. 8. But the opposed cooperating teeth 75, before they begin to separate more widely from each other, will have ascended the inclined plane formed by the lower portion of the upwardly inclined part of the chain guides 61 (seen in Fig. 2 at the left end of the horizontal basal lower run of the chain-guiding track) sufficiently to uproot the plants gripped between them. Only a slight upward movement of the plants being gripped between the opposed teeth is necessary to dislodge them from the soil. The plant-gripping teeth 75 may be made as broad as desired, more plants being pulled out when their breadth is increased. The plants located in the spaces between the teeth 75 of the horizontal run of the plant pulling device will not be pulled out. When such divergence takes place the tapered scavenger hoe 76 removes the plants as said teeth 75 release their grip upon them. Said hoe 76 is attached in a conventional manner by a screw bolt 76b to a suitable bracket 77 supported in any suitable manner by the main frame.

A rear cutter shears 80 has the front end of each of its twin blades pivotally supported at a fixed point by a vertically adjustable rod 81, said rod being turnably held in a bearing member 82 suspended by the hanger 57. Springs 83 (one of which is shown) are mounted between rods 81 and bearings 82 to hold the shears in an open or retracted position.

A properly timed oscillatory device 85 opens and closes the shears 80 to cause them to complete the trimming of the plants. Said shears 80 is located above and centrally of the chain-guiding tracks 61. Said device 85 is driven by a chain of gears 86. The upper member of said gear chain is mounted on a shaft 87 operatively supported by a hanger 88 depending from the aforementioned bearing member 70.

When the shears 80 are maintained in the open position, as shown in Fig. 16, the plants can pass between their blades without being cut. These shears are not vital to the successful operation of the machine.

The three assemblies 20, 21 and 22 (see Fig. 2) for operating upon the plants as aforesaid are duplicated in each of the units A, B, C and D of Fig. 1 and are simultaneously driven in a clutch-controlled manner from the rear ground wheels 12, the power being taken off from their axle 90 which has fixed to it a sprocket wheel 91 over which passes the main driving chain 92. Said chain 92, in turn, drives a sprocket wheel 93 fixed to the prime transmission shaft 94 to which is fixed the gear 95. Said gear 95 is properly positioned to have brought into engagement with it a gear 96 fixed to a shiftable shaft 97. When this shaft is brought into a position to intermesh said gears 95 and 96 the latter gear also meshes with gear 98 fixed to a shaft 99, and hence at such times the gear 96 serves as an idler to transmit the power from shaft 94 to shaft 99. The shifting of said shaft 97 is effected by means of a clutch assembly 100. To said shaft 99 is fixed a sprocket wheel 101 which by means of chain 102 transmits power to sprocket wheel 103 fixed to the jack shaft 104 carried by suitable bearings.

The four power units for frames A, B, C and D have identical driving mechanisms, the description of the first being as follows: The jack shaft 104 has fixed to it a sprocket wheel 105 which drives a chain 106 that drives wheel 107 fixed to a shaft 108 carried by suitable bearings 109. On said shaft 108 is mounted a wheel 110 which, in turn, drives the sprocket chain 111. Said chain 111 drives sprocket wheel 112 fixed to shaft 113 which is mounted on a bearing arrangement 114. To said shaft 113 is fixed sprocket wheel 115 which drives sprocket chain 116, said chain in turn driving sprocket wheel 117 that is secured to the hereinbefore mentioned shaft 69 from which lead the operating connections for driving the various implements that operate upon the plants, as already in part explained.

Shaft 69a has fixed to it a sprocket wheel 120 which drives a chain 121 that, in turn, drives a sprocket wheel 122 fixed to a shaft 123 having intermediate bearings 124 and end bearings 125.

Each of the auxiliary frames (A, B, C or D) is vertically adjustable along angularly grooved guide strips 130 carried by the main frame the corners of said auxiliary frames having a working fit within said grooves. Vertical adjustment of each auxiliary frame is effected by means of a handwheel 131 for each auxiliary frame, mounted in the upper rear portion of the main frame adjacent to the driver's seat 132, said handwheel having a screwthreaded vertical stem which operates in a screwthreaded bore in said auxiliary frame.

In addition to the aforesaid guide strips 130, there is provided for each auxiliary frame a pendant guide stem 135 carried by the upper front portion of the main frame and passing loosely through a hole provided for it in the underlying auxiliary frame.

The clutch bar 100a working in suitable guides and operable by lever 100b, carries a wedge portion 100c which acts against a shoulder or abutment member carried by the shaft 97 and thereby shifts the gear 96 into an intermediate, power transmitting relation to gears 95 and 98 (see Figs. 1 and 19). When said clutch bar is moved in the opposite direction a spiral tension spring 97b, fastened at one end to the frame and at its opposite end to said shaft 97, withdraws said wheel 96 from its power transmitting position.

Preparatory to operating the embodiment of the invention illustrated in the drawings the forward extension 18 of the device will be attached to a suitable tractor whereby the machine will be drawn back and forth across a field lengthwise of the rows of plants after the manner of a cultivator, the ground wheels both of the device itself and of the tractor which trails it being positioned to travel along the spaces between the rows. In Figs. 1 and 2 the clutch assembly 100 is shown in the disengaged position, but when the clutch bar 100a is retracted its wedge portion 100c shifts gear 96 (Fig. 19) into the power transmitting relation to gears 95 and 98 causing power from shaft 94 to be conveyed to shaft 99 and thence through gear 101 and chain 102 to gear 103 fixed to the line shaft 104 from which are driven the mechanisms carried by the auxiliary frames A, B, C and D.

I claim:

1. In a device of the kind described, ground wheels, a frame supported by said wheels, a plant-gripping device comprising two track members or guides having each a horizontally extending run which is parallel with and adjacent to that of the other, an endless chain for each of said guide portions to travel along its inner face in a cooperative relation to the other chain, said chains having opposed cooperating teeth between which are gripped the plants of parts of a row as the aforesaid ground wheels advance in a direction parallel to the plant rows, the plants being gripped only between the outer ends of opposed teeth, means operatively connecting said chains with said ground wheels to cause the plant-engaging portions of said chains to move, in relation to said frame, oppositely to the direction in which the ground wheels advance, said tracks for said chains having upwardly deflected divergent rear portions to cause said chains to pull out and then release the plants which they grip between them.

2. In a vehicle including ground wheels to travel over a field lengthwise of rows of plants, a plant topping assembly mounted on said vehicle, a scooping assembly mounted on said vehicle rearwardly of said topping assembly to remove the tops severed by said topping assembly, and means operatively connected with at least one of said ground wheels to operate said assemblies intermittently and in a properly timed sequence, said operating means including two shafts rotatably mounted upon the vehicle in a parallel, spaced apart relation to each other and two gears one fixed to each of said shafts, said gears being in an opposite spaced apart relation to each other; an idle gear carried by a shaft shiftably mounted upon the vehicle to move said idle gear to and from between said other two gears to transmit motion from one to the other of them, and means to automatically and intermittently shift the last recited shaft for the purpose stated.

3. The subject matter of claim 2 and, said intermittent shifting means including a continually rotatable cam wheel having a rest portion, a beveled portion and an active portion, said shiftable shaft being provided with a part to engage said cam portions, and a spring whereby said shiftable shaft is moved in opposition to the action of said cam wheel thereon.

4. In a machine of the kind described, ground wheels, a frame supported upon said wheels, a plant-gripping device supported by said frame and including two endless chains, guide means for said chains whereby a portion of each of them is directed along a horizontal path extending lengthwise of rows of plants when the machine is in operation and in a parallel adjacent relation to the corresponding part of the other chain, each of said chains carrying a spaced apart series of plant-gripping teeth to cooperate with those of the other, and means operatively related to the aforesaid ground wheels to drive both of said endless chains in the same direction, said guide means being arranged to cause said plant-gripping teeth to move adjacent to the surface of the ground and ascend slightly thereabove during their plant-gripping action and then to withdraw farther from each other after having uprooted the plants gripped between the ends of opposed teeth.

5. The subject matter of claim 1, and there being a plurality of said plant-gripping devices, and manually operable means mounted upon the machine to move them upwardly from and downwardly to an operative position.

AMBROSIO GUERRERO.